(12) United States Patent
Hafer

(10) Patent No.: US 6,439,779 B1
(45) Date of Patent: Aug. 27, 2002

(54) SYSTEM FOR COUPLING A LIGHTWAVE CONDUCTOR CABLE ON COUPLING ELEMENTS OF A HOUSING

(75) Inventor: Peter Hafer, Hamburg (DE)

(73) Assignee: FOS GmbH, Hamburg (DE)

( * ) Notice: Subject to any disclaimer, the term of this patent is extended or adjusted under 35 U.S.C. 154(b) by 0 days.

(21) Appl. No.: 09/552,957

(22) Filed: Apr. 20, 2000

(51) Int. Cl.[7] .................................................. G02B 6/36
(52) U.S. Cl. ........................... 385/76; 385/86; 385/87; 385/136; 385/137; 385/139
(58) Field of Search .............................. 385/56, 59, 60, 385/62, 69, 70, 71, 76, 77, 78, 86, 87, 134, 135, 136, 137, 139

(56) References Cited

U.S. PATENT DOCUMENTS

| | | | |
|---|---|---|---|
| 5,133,038 A | | 7/1992 | Zipper ........................ 385/135 |
| 5,231,687 A | | 7/1993 | Handley ..................... 385/139 |
| 5,283,853 A | * | 2/1994 | Szegda ....................... 385/139 |
| 5,371,827 A | * | 12/1994 | Szegda ....................... 385/136 |
| 5,444,810 A | * | 8/1995 | Szegda ....................... 385/139 |
| 5,745,633 A | * | 4/1998 | Giebel et al. ............... 385/136 |
| 5,793,920 A | * | 8/1998 | Wilkins et al. ............. 385/135 |
| 5,793,921 A | * | 8/1998 | Wilkins et al. ............. 385/135 |
| 5,825,961 A | * | 10/1998 | Wilkins et al. ............. 385/135 |
| 5,892,870 A | * | 4/1999 | Fingler et al. ................ 385/59 |
| 6,226,437 B1 | * | 5/2001 | Kikuchi et al. ............. 385/136 |

FOREIGN PATENT DOCUMENTS

| | | | |
|---|---|---|---|
| DE | 9407851.3 | 11/1994 | ............. 385/135 X |

* cited by examiner

*Primary Examiner*—Brian Healy
(74) *Attorney, Agent, or Firm*—Thomas M. Freiburger

(57) ABSTRACT

The invention relates to a system for coupling of a lightwave conductor cable with many lightwave conductors (8) on coupling elements in a housing, which contains a clamping element for the end of the lightwave conductor cable and a number of coupling elements (9), which correspond with the number of the lightwave conductors to be plugged. According to the invention the end of the lightwave conductor cable is fixable by the clamping element on a chassis part or clamping flange (2) of the housing, and the lightwave conductors, which extend out from the cable end, are surrounded with a flexible cable sleeve. The ends of the cable sleeves, which are faced toward the cable end, are connected together and anchored in the clamping element. (FIG. 1)

5 Claims, 2 Drawing Sheets

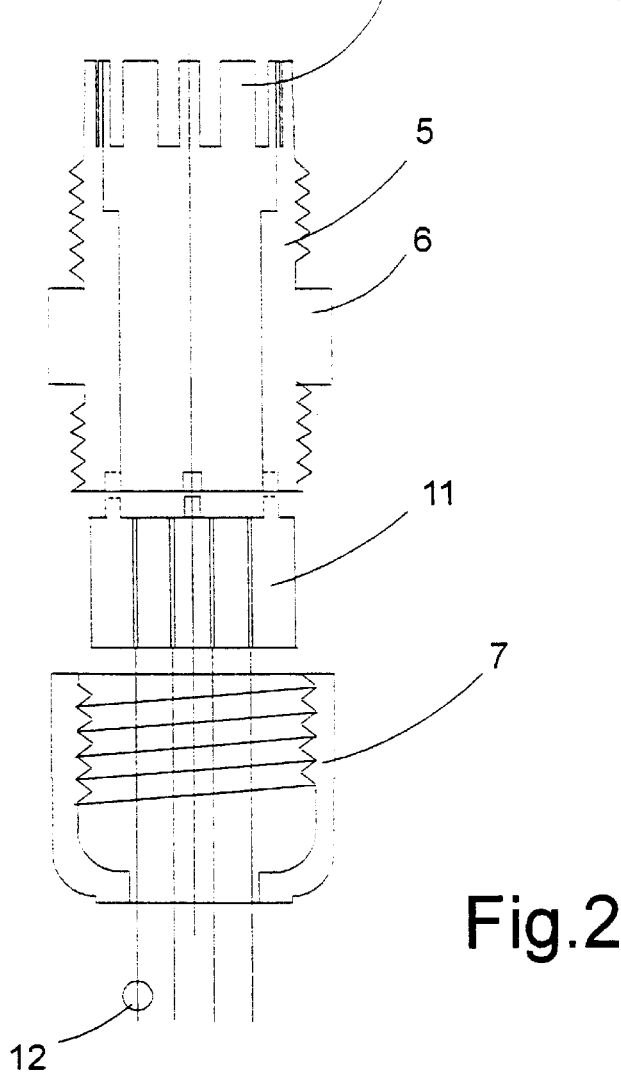
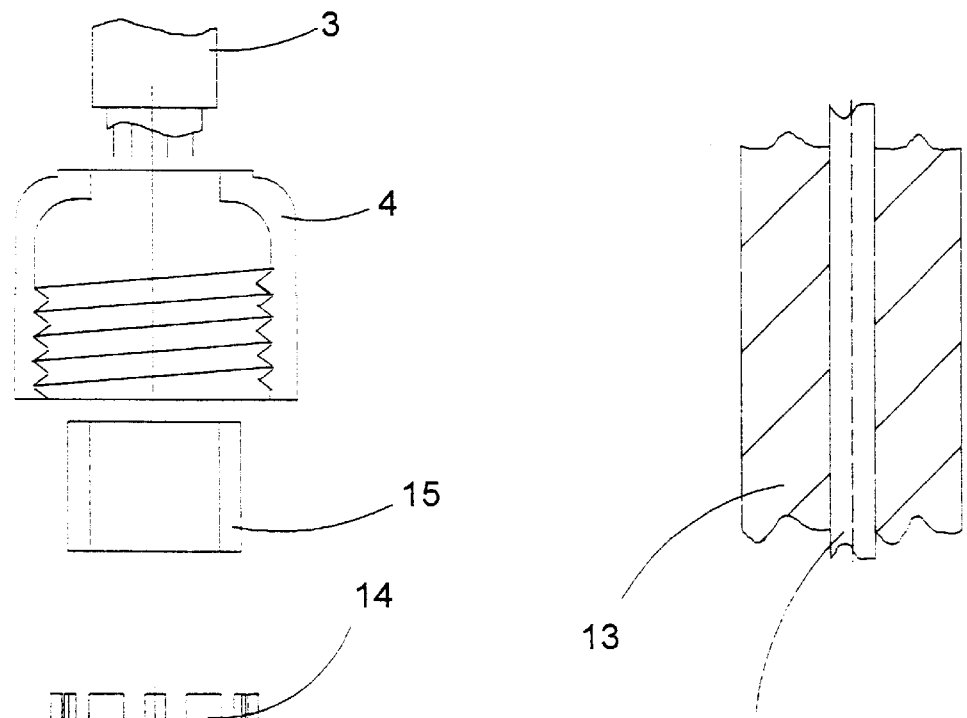
Fig.2
Fig.3

SYSTEM FOR COUPLING A LIGHTWAVE CONDUCTOR CABLE ON COUPLING ELEMENTS OF A HOUSING

BACKGROUND OF THE INVENTION

The invention relates to a system for coupling of a lightwave conductor cable on coupling elements of a housing according to claim 1.

In present communications systems, often lightwave conductors are used for the transmission of higher and highest data rates. These lightwave conductors generally show a high transmission performance, data safety, interference immunity and band width, but their handling in case of laying the cable and coupling onto the coupling elements is time-consuming, complicated and expensive.

For the connection of a lightwave conductor cable with many single lightwave conductors with coupling elements in a housing, it is necessary to feed the lightwave conductor cable into the housing with release of tension and there to splice the lightwave conductor cable with the ends of so-called pigtails, which are connected in the housing together with the connection element. The splice procedure itself is complicated, laborious and time-consuming.

From U.S. Pat. No. 5,133,038 a so-called splice housing is well-known, for the coupling of a lightwave conductor cable with multiple lightwave conductors on coupling elements in the housing, in which one or more lightwave conductors are anchored by means of a clamping element on a housing wall, whereby the clamping element particularly is used for tension relief and for supporting the lightwave conductor cable. The single fibers of the lightwave conductor cable are brought to the coupling elements inside the splice housing avoiding a small bending radius.

Similar housings are well-known from German Utility Model 9407851.3 and U.S. Pat. No. 5,231,687.

SUMMARY OF THE INVENTION

This invention describes a system for coupling of a lightwave conductor cable on coupling elements of a housing in which no splice procedure is necessary, but nevertheless the lightwave conductors remain mechanically preserved.

This is accomplished through the invention according to claim 1. Preferred embodiments of the invention are described in subclaims.

According to the invention a system is described for the coupling of a lightwave conductor cable with many single lightwave conductors on coupling elements of a housing, in which the single fibers, which stand out from the ends of the cables, are surrounded by a flexible cable sleeve. The ends of the cable sleeve, toward the end of the cable, are connected together and anchored in the clamping element.

By this arrangement, single fibers are surrounded by a sheath, which prevents breaking or buckling. The clamping of the sleeves together preferably is achieved in a splitting element which itself is contained in the clamping element for fixing of the lightwave conductor cable in the housing. Thereby, the sleeves of the single lightwave conductors are solidly connected with the housing and the lightwave conductor cable while the lightwave conductors remain longitudinally movable in the cable sleeves or bushes.

A housing usable for the system of the invention can comprise a simple sheet metal piece, which contains a front plate with many coupling elements and a back side on which the clamping element is screwed. For closing the housing a simple cover can be provided, which is lockable with a screw plug, click-stop device or clamp plug.

The clamping element preferably comprises a screw device, which serves at the same time as a tension relief piece for the lightwave conductor cable. In the receiving space of the clamping element the splitting element can be fixed, which picks up the rearward ends of the cable sleeves.

Preferably the cable sleeves are glued in the splitting element. In a further embodiment, the sleeves can merely be glued together and through adequate dimensioning it is guaranteed that the joined sleeves cannot slide out of the clamping element.

The use of the inventive system is particularly advantageous in that splicing work is not necessary, and the mechanical expense for the manufacturer of a connection piece for the lightwave conductor cable is very small.

DESCRIPTION OF THE DRAWINGS

Hereafter the invention is illustrated in greater detail with an exemplary embodiment:

FIG. 2 shows a cross section through a clamping element.

FIG. 3 is a cross section of a lightwave conductor, provided with a sleeve or bush.

DESCRIPTION OF PREFERRED EMBODIMENTS

Figure 1:
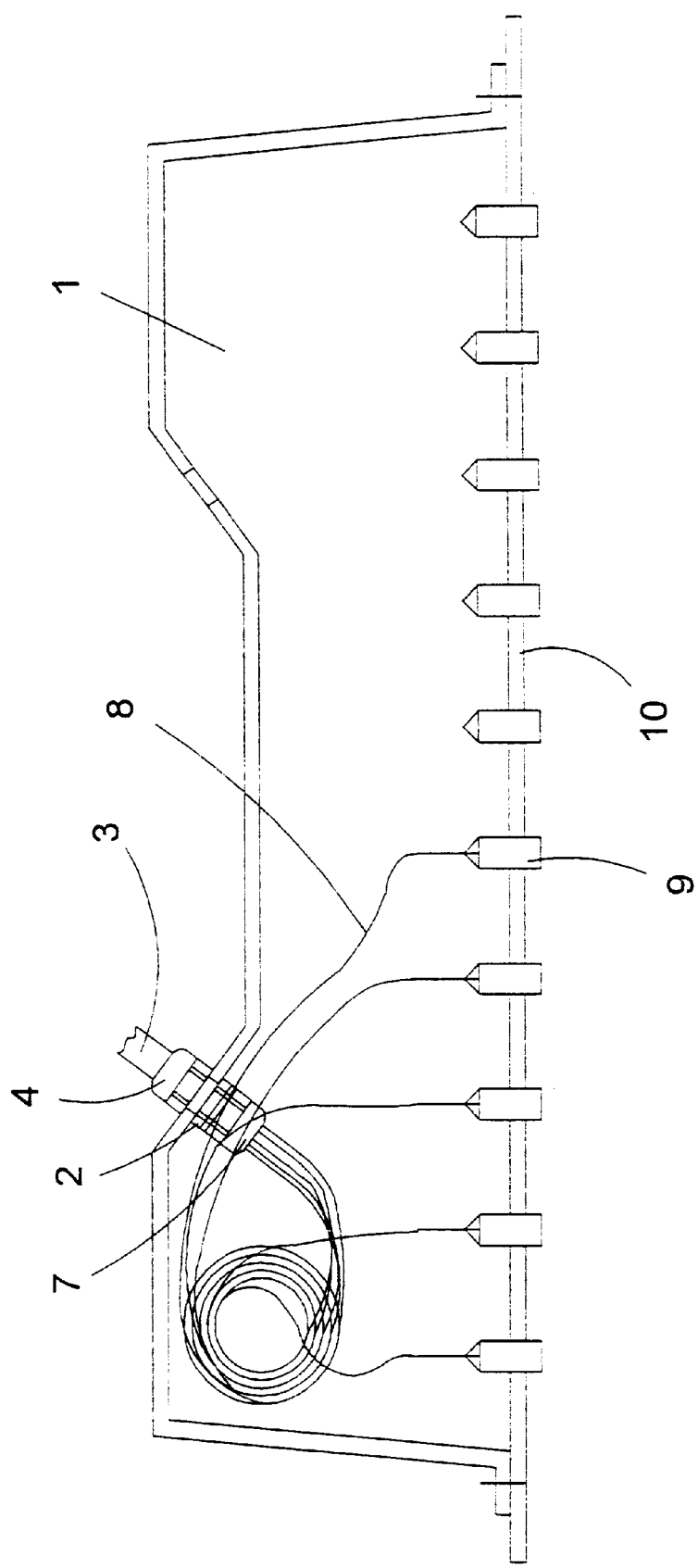
FIG. 1 is a top view of a housing with a coupled lightwave conductor cable.

FIG. 1 demonstrates a cuboid housing, provided at its front side with a front plate 10 and if needed containing a flat bottom plate 1. The front plate 10 shows numerous side-by-side disposed coupling elements 9, on which the lightwave conductors or fibers from the back side are able to connect. The back side of the housing contains a clamping flange having a bore in which the clamping element can be inserted. Alternately, the clamping element can be directly screwed into the back side of the housing in a part of the chassis 2. The lightwave conductor cable 3 is brought to the housing from the back side and its shell ends in the clamping element.

The clamping element consists of a base body 5 (FIG. 2) containing an exterior screw thread, on which the screw cap 4 can be screwed. As a consequence of screwing on the screw cap 4, the lamellas 14 of the base body 5, which project above a guide ring 15, are squeezed and thus clamp the end of the lightwave conductor cable 3 so as to relieve tension.

The clamping element contains on the opposite side a further screw cap 7, which is screwable against an integrally fitted holding ring 6 of the base body, the clamping flange or chassis part 2 being located between the holding ring 6 and the screw cap 7, whereby the clamping element is solidly screwable on the chassis part 2 or the clamping flange.

The single lightwave conductors 8 go in the housing in a tortuous path to the coupling elements 9. For their protection each conductor is surrounded with a flexible cable sleeve or bush, and thus the rear ends of the cable sleeves are received together in the clamping element.

FIG. 2 shows a cross section of a clamping element. The outer shell of the lightwave conductor cable 3 ends approximately in the middle of the clamping element. The lightwave conductors, which extend out of the cable, are individually inserted into the cable sleeves in the splitting device 11 through the screw cap 4, the guide ring 15 and the base body 5, so that they exit the clamping element through the cable sleeves.

The splitting device 11 can be formed as a round or rectangular body. The splitting device has bores, in which the protecting sleeves are fixed. The sleeves are anchored solidly in the body 11, for example through gluing. By the fastening of the clamping element on the chassis part 2, the splitting device 11 also becomes anchored in the receiving space of the clamping element.

The protecting sleeves end near the individual conductors shortly before the coupling elements 9 and can by their anchoring attach themselves together with the coupling elements 9, so that the conductors themselves are open nowhere in the housing.

FIG. 3 shows a cross section of a lightwave conductor or fiber 12 with surrounding sheath or husk 13.

For the insertion of a lightwave conductor cable 3 in the housing, first the end of the lightwave conductor cable 3 is stripped of the sleeve for a length of about 40 cm. Then the single conductors are degreased and provided with a sliding emulsion. When they have been inserted through the base body 5, the individual conductors are put in through the splitting device 11 into the fixed cable sleeves and the whole bundle is advanced, after all fibers have been put into the sleeves, until the splitting device 11 abuts against the end of the cable shell. At the same time, the splitting device 11 is put into the clamping element, which has been put on the end of the cable just previously. Then the cable, connected with the clamping element, splitting device and sleeves, is put into the chassis of the housing and is fixed by the screw cap 7. After this, the fixing of the single fibers on the coupling elements 9 can follow.

Reference List

1. Bottom plate
2. Chassis part
3. Lightwave conductor cable
4. Screw cap
5. Base body
6. Holding ring
7. Screw cap
8. Lightwave conductor
9. Coupling element
10. Front plate
11. Splitting device
12. Fiber
13. Cable sleeve
14. Lamellas
15. Guide ring

What is claimed is:

1. System for coupling of a lightwave conductor cable (3) with many lightwave conductors (8) on coupling elements (9) in a housing, containing a clamping element (4–7) for the end of the lightwave conductor cable (3) and a number of coupling elements (9), which correspond to the number of the lightwave conductors, to be plugged such that the end of the lightwave conductor cable is fixable by the clamping element (4–7) on a chassis part or a clamping flange (2) of the housing, characterized in that the lightwave conductors (8), which extend out from the cable ends, are surrounded with a flexible cable sleeve (13), and the ends of the cable sleeves, which are faced toward the cable end, are connected together and are anchorable in the clamping element.

2. The system according to claim 1, characterized in that the housing has a front plate (10) with many coupling elements (9) for coupling onto the lightwave conductors (8) of the lightwave conductor cable and a chassis part with a bore for receiving the clamping element and a cover.

3. The system according to claim 1, characterized in that the clamping element (4–7) is formed as a screw element consisting of several parts, which is received in the bore of the back side of the housing, wherein the screw element contains a tension relief element, capable of being secured to the lightwave conductor cable end, and a splitting device (11), inserted in a receiving space of the screw element, and that the screw element is capable of being screwed on the chassis part or the clamping flange of the housing, and that the rear ends of the cable sleeves (13) are fixed in the splitting device (11).

4. The system according to claim 3, characterized in that the cable sleeves (13) are glued in the splitting device (11).

5. The system according to any of claims 1–4, characterized in that the clamping element (4–7) and/or the splitting device (11) are formed of synthetic material, particularly polyethylene.

* * * * *